United States Patent [19]
Narula

[11] Patent Number: 5,134,107
[45] Date of Patent: Jul. 28, 1992

[54] SINGLE PHASE METAL-ALUMINA MADE BY SOL-GEL PROCESSING

[75] Inventor: Chaitanya K. Narula, Ann Arbor, Mich.

[73] Assignee: Ford Motor Company, Dearborn, Mich.

[21] Appl. No.: 756,105

[22] Filed: Sep. 6, 1991

[51] Int. Cl.$^5$ .................. B01J 21/04; B01J 23/10; B01J 32/00

[52] U.S. Cl. .................. 502/303; 502/304; 502/439

[58] Field of Search .................. 502/303, 304, 439

[56] References Cited

U.S. PATENT DOCUMENTS

| | | | |
|---|---|---|---|
| 3,867,312 | 2/1975 | Stephens | 252/462 |
| 3,978,004 | 8/1976 | Daumas et al. | 252/462 |
| 3,993,598 | 11/1976 | Arey, Jr. et al. | 252/462 |
| 4,295,818 | 10/1981 | Angwin et al. | 431/7 |
| 4,318,827 | 3/1982 | Antos | 252/462 |
| 4,469,815 | 9/1984 | Sambrook et al. | 502/303 |
| 4,526,885 | 7/1985 | Day et al. | 502/439 X |
| 4,530,918 | 7/1985 | Sambrook et al. | 502/303 |
| 4,550,093 | 10/1985 | Fanelli et al. | 502/107 |
| 4,868,150 | 9/1989 | Spooner et al. | 502/439 |

OTHER PUBLICATIONS

"Volatile Double Alkoxides of Lanthanons", Mehrotra et al., Chemical Communications (1968).
"Double Isopropoxides of Lanthanons with Aluminum:Tris (Diisopropoxoaluminiumdi-m-isopropoxy) Ln(III)", Synthesis in Inorganic and Metal-Organic Chemistry (1973).

*Primary Examiner*—William J. Shine
*Attorney, Agent, or Firm*—Joseph W. Malleck; Roger L. May

[57] ABSTRACT

This invention is directed to a method for lanthanide-aluminum-oxide materials according to sol-gel techniques from heterobimetallic alkoxides comprising tris[(bis(2-propanolato)alumina)hexakis($\mu$-(2-propanolato))] lanthanides, and the materials so made. The materials may be in varied forms like sols, gels, xerogels, and calcined materials.

20 Claims, 3 Drawing Sheets

SINGLE PHASE METAL-ALUMINA MADE BY SOL-GEL PROCESSING

BACKGROUND OF THE INVENTION

1. Technical Field

This invention is related to the art of making lanthanide-aluminum-oxide materials.

2. Discussion of Related Art

Sol-gel processes allow for the low temperature preparation of aluminum oxide materials of high purity and controlled microstructure. These materials can be in such forms as gels, aerogels, and xerogels. Sol-gel processes have been found useful in preparing supported and unsupported inorganic membranes for chemical sensor and separation applications, for automobile catalyst washcoats, and for optical coatings for automotive glass. Additionally, these processes have been found useful to prepare monoliths, fibers and monosized fibers from sols.

In some applications, it is desirable to incorporate at least one other metal atom in the aluminum oxide material. For example, it has been found desirable when employing the aluminum oxide material as a catalyst support to include lanthanum or cerium atoms, or both, in the aluminum oxide (alumina) matrix. Incorporating either or both of these metal atoms in the alumina matrix tends to prevent structural changes that occur in unstabilized $\gamma$-alumina at high temperatures. In addition both metals are desirably included to provide oxygen storage in the alumina for catalytic applications involving oxidation. When using sol-gel techniques to make the alumina material, these other metal atoms are added by co-hydrolyzing one or more metal-alkoxides with aluminum alkoxide. As is well known in the art, such alkoxides when combined in water hydrolyze resulting in a mixture of hydroxides. For example, a mixture of aluminum alkoxide and lanthanum alkoxide on hydrolysis forms a mixture of aluminum hydroxide and lanthanum hydroxide. Some amount of mixed hydroxide is also formed. Undesirably the final product of such a mixture comprises a non-uniform two-phase distribution of metal oxide in an aluminum oxide matrix.

SUMMARY OF THE INVENTION

This invention overcomes the above disadvantages and is directed to a method for making single phase lanthanide-aluminum-oxide materials. This method comprises reacting according to sol-gel techniques (i) water and (ii) heterobimetallic alkoxides comprising tris[(bis(2-propanolato)alumina)hexakis($\mu$-(2-propanolato))]lanthanide represented by the general chemical formula Ln[Al(OPri)$_4$]$_3$, Ln being a lanthanide. Lanthanide is meant to include the members of the lanthanide series of the Periodic Table such as lanthanum and cerium. A lanthanum-aluminum-oxide material according to the present invention is made from tris[(bis(2-propanolato)alumina)hexakis($\mu$(2-propanolato))]lanthanum, La[Al(OPri)$_4$]$_3$. A cerium-aluminum-oxide material according to the present invention is made from tris[(bis(2-propanolato)alumina)-hexakis($\mu$(2-propanolato))]cerium, Ce[Al(OPri)$_4$]$_3$. A single phase lanthanum-cerium-aluminum-oxide material according to the present invention is made from a mixture of these two heterobimetallic alkoxides. A preferred material of this latter type is made from a mixture of these alkoxides (i.e., La[Al(OPri)$_4$]$_3$:Ce[Al(OPri)$_4$]$_3$) in a molar ratio from 1:1 to 1:3.

According to another aspect of the present invention, it is also directed to sols, gels, and subsequent xerogels, and aerogels made by the method disclosed above as well as products made by calcining such materials.

The lanthanide-aluminum-oxide materials according to the present invention are preferably made from sols by a method which includes forming a reaction mixture comprising the heterobimetallic alkoxides and water, and subsequently adding acid to the reaction mixture to form a sol. Since the alkoxides of the present invention are solids they are generally first dissolved in an alcohol, preferably the parent alcohol, i.e., 2-propanol, and then combined with water in forming the reaction mixture. The sol is preferably a clear sol. Alcohol formed as a result of hydrolysis of the alkoxides, as well as the alcohol used as solvent, may be removed from the reaction mixture. The sol may be stabilized to allow use over an extended period of time by heating the sol for a time sufficient to form a stable sol. According to one application of the sol, it is coated onto a substrate and calcined generally at a temperature above about 300° C., preferably between about 300° C. and 900° C., to form a lanthanide-aluminum-oxide material. Gels can be prepared by concentrating the sols disclosed above. Xerogels may be prepared from the above disclosed sols by removal of substantially all volatiles. Gels may also be formed directly from the reaction of the heterobimetallic alkoxide and water in alcohol.

In one embodiment of the present invention wherein a lanthanum-aluminum-oxide material is formed from a sol, it is preferably made by steps comprising adding a first acid to a reaction mixture formed from La[Al(OPri)$_4$]$_3$ and water, maintaining the reaction mixture at an elevated temperature, removing 2-propanol formed in the reaction mixture as a result of hydrolysis of La[Al(OPri)$_4$]$_3$, and adding a second acid to the reaction mixture to form a sol. Alcohol is included in the reaction mixture as a solvent. The first and second acid may independently be selected from any acid, organic and inorganic.

According to another embodiment wherein a cerium-aluminum-oxide material is formed, it is preferably made by a method including the steps of forming a reaction mixture from Ce[Al(OPri)$_4$]$_3$ and water, maintaining the reaction mixture at an elevated temperature to form a gel thereof, adding an acid to the gel to convert the gel to a sol. As disclosed above, alcohol is included as a solvent.

According to yet another embodiment of the present invention wherein a lanthanum-cerium-aluminum oxide material is formed from a sol, it is formed by a method including the steps of forming a reaction mixture of La[Al(OPri)$_4$]$_3$ and Ce[Al(OPri)$_4$]$_3$ and water, maintaining the reaction mixture at an elevated temperature, removing 2-propanol formed in the reaction mixture as a result of hydrolysis of the La[Al(OPri)$_4$]$_3$ and Ce[Al(OPri)$_4$]$_3$, and adding an acid to the suspension to form a sol. Alcohol is also included in the reaction mixture as a solvent.

DETAILED DESCRIPTION AND BEST MODE

Figure 1:
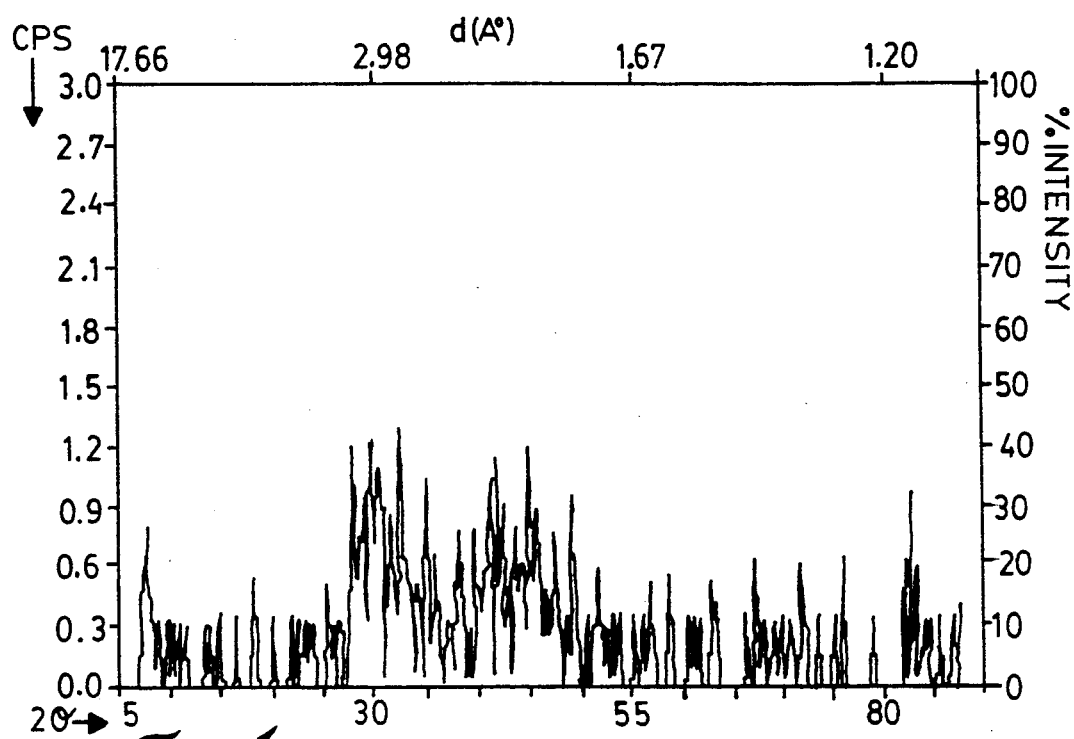
FIG. 1 is an x-ray powder diffraction study of one embodiment of the present invention comprising single phase lanthanum-aluminum-oxide material after heating at 700° C. which shows that it is amorphous.

This invention is directed to a method for making single phase lanthanide-aluminum-oxide materials according to sol-gel techniques from particular alkoxide compounds which comprise two different metals, lanthanide (Ln) and aluminum (Al), and to materials so made. The method comprises, in its broadest embodiment, reacting water and heterobimetallic alkoxide selected from the group comprising Ln[Al(OPri)$_4$]$_3$ where Ln is a metal of the lanthanide family of the Periodic Table such as lanthanum (La) and cerium (Ce). According to the method, a compatible mixture of such alkoxides, e.g., La[Al(OPri)$_4$]$_3$ and Ce[Al(OPri)$_4$]$_3$ also may be employed. Sol-gel technology is widely known and comprises, at the least, reacting water and an alkoxide having hydrolyzable alkoxy groups. Any such technology may be used to make the material. Preferred sol-gel methods for making the materials according to the present invention are detailed below. Still others considered within the scope of the invention will be apparent to those skilled in the art in view of the present disclosure.

Advantageously, the materials of the present invention comprise lanthanide metal uniformly distributed throughout the alumina matrix and chemically linked into the alumina by bridges such as lanthanide-oxygen-aluminum or lanthanide-hydroxide-aluminum. It has been found that the invention materials made by sol-gel processes from particular heterobimetallic alkoxides have a higher surface area than materials conventionally made from mixtures of oxides like aluminum oxide and lanthanum oxide. This increased surface area is advantageous, e.g., when the material is employed as a catalyst support.

The heterobimetallic alkoxides employed in the present invention may be made by techniques described, e.g., in "Volatile Double Alkoxides of Lanthanons", R. C.: Mehrotra and M. M. Agrawal, Chemical Communications, 1968, p. 469-470; and "Double Isopropoxides of Lanthanone With Aluminum:Tris(diisopropoxoaluminiumdi-$\mu$-isopropoxy) Ln(III)", R. C. Mehrotra, M. M. Agrawal and A. Mehrotra, Synthesis In Inorganic and Metal-Organic Chemistry, 3(2), 181-191 (1973). No disclosure is made in these references as to the use of such alkoxides.

Generally, the lanthanide-aluminum-oxide materials according to the present invention are made from single phase sols. The sol may be made by forming a reaction mixture of the heterobimetallic alkoxides with water, and adding acid to the reaction mixture to form a sol. Acids employed in embodiments of the present invention may be selected from any organic and inorganic acids which include, but are not limited to, nitric, hydrochloric, sulfuric, acetic, and propionic acid. Alcohol is generally employed as a solvent for the alkoxide prior to it being combined with water. Alcohols which may be broadly employed according to embodiments of the present invention include 2-propanol, n-butanol, and sec-butanol, with 2 propanol being preferred. The sol is preferably stabilized by maintaining the reaction mixture for a time and at a temperature sufficient to form a stable sol. A stable sol is one that maintains its sol properties and does not experience any substantial gelling when exposed to air or moisture for a significant period of time, e.g., months. The sols made herein find use, e.g., to prepare ceramic membranes for chemical sensor devices, films, optical coatings on glass, and washcoats for catalysts substrates. In the case of forming such washcoats, the sol would be coated on a substrate and then the coating dried and subsequently calcined at an elevated temperature. Generally calcination is carried out at a temperature above about 300° C., preferably between about 300° C. and 900° C., to form a lanthanide-aluminum-oxide material according to an embodiment of the present invention.

According to one preferred method of preparing a single phase sol of lanthanum aluminum alkoxide, La[Al(OPri)$_4$]$_3$, the lanthanum aluminum alkoxide is dissolved in an alcohol and then added to water at an elevated temperature generally with stirring. This reaction mixture is then further heated and a first acid is added to it. The reaction mixture is maintained at an elevated temperature to remove 2-propanol formed as a result of the hydrolysis of the alkoxide, and thereafter a second acid is added to obtain a substantially clear sol. The first and second acids may independently be selected from any organic and inorganic acids. Generally, an inorganic acid would be used to help initiate formation of the sol, while organic acids like acetic acid are preferred to help obtain the clear sol. The sol is desirably maintained at gentle reflux at an elevated temperature for an extended time to stabilize the sol.

Optimal processing conditions such as reaction times and temperatures as well as amounts of components like solvents for making the sol may vary as would be apparent to those skilled in the art in view of the present disclosure. For example, according to one embodiment, the reaction mixture may be formed at 60°, then heated to 95° C. to form the sol. On concentrating the sol, gel formation takes place, and if it is further dehydrated at an elevated temperature, e.g., 100° C., it forms a transparent xerogel of amorphous lanthanum-alumina. The xerogel may be heated to transform any La—(OH)—Al bonds to La—O—Al bonds. The sol may be coated onto a substrate such as glass and dried to obtain a xerogel in the form of a supported membrane. According to another application, the sol is coated onto a substrate and calcined generally at a temperature above about 300° C., preferably between about 300° C. and 900° C., to form a lanthanum-aluminum-oxide material.

Rather than forming a gel from the sol above, gels may be made more directly from lanthanum aluminum alkoxide. For example, the addition of a wet alcohol, generally meant to be one containing more than 6 equivalents of water, to a solution of the alkoxide in an alcohol at room temperature results in gel formation instantaneously at the contact layer. Complete gelation results with time, and if volatiles are removed, a xerogel consisting essentially of lanthanum-aluminum-oxide is produced. Alternatively, a gel may be prepared along the lines of the sol preparation disclosed herein except that more eqivalents of water are used than in sol preparation. For example to form the gel 12 equivalents of water mixed in alcohol may be added to a solution of the alkoxide in an alcohol. The mixing generally is carried out at a low temperature such as −78° C. and on warming, e.g., to −20° C., a gel is obtained. The gel may be converted to a xerogel by removal of the solvent, preferably in a vacuum. A lanthanum-aluminum-oxide aerogel may be prepared from the gel by critical point drying.

The following is a preferred embodiment of a process for forming a cerium-aluminum-oxide material according to the present invention. A single phase sol from $Ce[Al(OPri)_4]_3$ may be prepared by forming a solution of this alkoxide in alcohol and combining it with water at an elevated temperature such as 90° C. A gel forms immediately. After the reaction mixture is stirred at an elevated temperature, e.g., 90° C. for 30 minutes, addition of an acid, e.g, acetic acid, results in sol formation. To stabilize the sol, it is preferably heated at an elevated temperature for an extended time, e.g., 90° C. for 16 hours. The sol can be converted to a gel by the partial evaporation of the solvent. The sol can be used, for example, as a coating on a substrate and subsequently calcined as disclosed herein.

The reaction of $Ce[Al(OPri)_4]_3$ with seven or more equivalents of water at a low temperature, e.g., −78° C., yields a sol which undergoes gelation on warming. The gel which is obtained may be dried, e.g., in a vacuum, to yield a xerogel as a fine powder. The powder is found to be amorphous by x-ray powder diffraction studies.

Sol-gel techniques may also be employed to make alumina materials comprising more than one lanthanide, e.g., lanthanum and cerium atoms, as a single phase material. According to a preferred method optimally carried out in a strictly inert atmosphere, a mixture of $La[Al(OPri)_4]_3$ and $Ce[Al(OPri)_4]_3$ is dissolved in alcohol and water. The suspension formed is stirred at an elevated temperature and then an acid is added. Preferably alcohol is removed from the reaction mixture after which it is heated under gentle reflux for an extended period of time to form a stable sol and then allowed to cool. Preferably, these two alkoxides are employed in a molar ratio of about 1:1 to 1:3 in forming the sol. The ratio of lanthanum to cerium can be varied while maintaining a desirable 1:3 molar ratio of (lanthanum+cerium):aluminum which is optimal in catalyst supports useful in high temperature automotive exhaust gas conversion applications. For such applications, a coating of the sol provided on a substrate would be calcined at an elevated temperature as disclosed herein. A xerogel of the sol material is prepared by evaporation of all of the solvent from the reaction mixture.

A single phase gel may be prepared according to an embodiment of this invention from these two heterobimetallic alkoxides. Accordingly, after they are dissolved in alcohol a stoichiometric amount of water is added to replace all 2-propanolato groups of the alkoxides. The water is generally used dissolved in an alcohol. The water/alcohol mixture is added slowly with stirring at a low temperature, e.g., −78° C. After complete addition, stirring is stopped and the reaction mixture is slowly warmed to, e.g., room temperature. Gel formation takes place at a low temperature. A xerogel may be obtained by removing the volatiles as in a vacuum. The xerogels may be heated to elevated temperatures and maintained at that temperature to obtain a powdered amorphous material.

As will be apparent to those skilled in the art in view of the present disclosure, the time, temperature, alcohols and acids employed in these sol-gel techniques may be varied while staying within the scope of the present invention.

EXAMPLE 1

Tris[(bis(2-propanolato)alumina)-hexakis(μ-(2-propanolato))]lanthanum (3.0 g) is dissolved in dry 2-propanol (10 ml) and added to water (80 ml) at 80° C. with stirring. This reaction mixture is heated to 90° C. and nitric acid (2.8 ml of 0.01M) is added to it. The reaction mixture is boiled at 90° C. to remove 2-propanol, and thereafter acetic acid is added dropwise to obtain an almost clear sol. The sol is maintained at gentle reflux at 100° C. for 16 hours.

Figure 2:
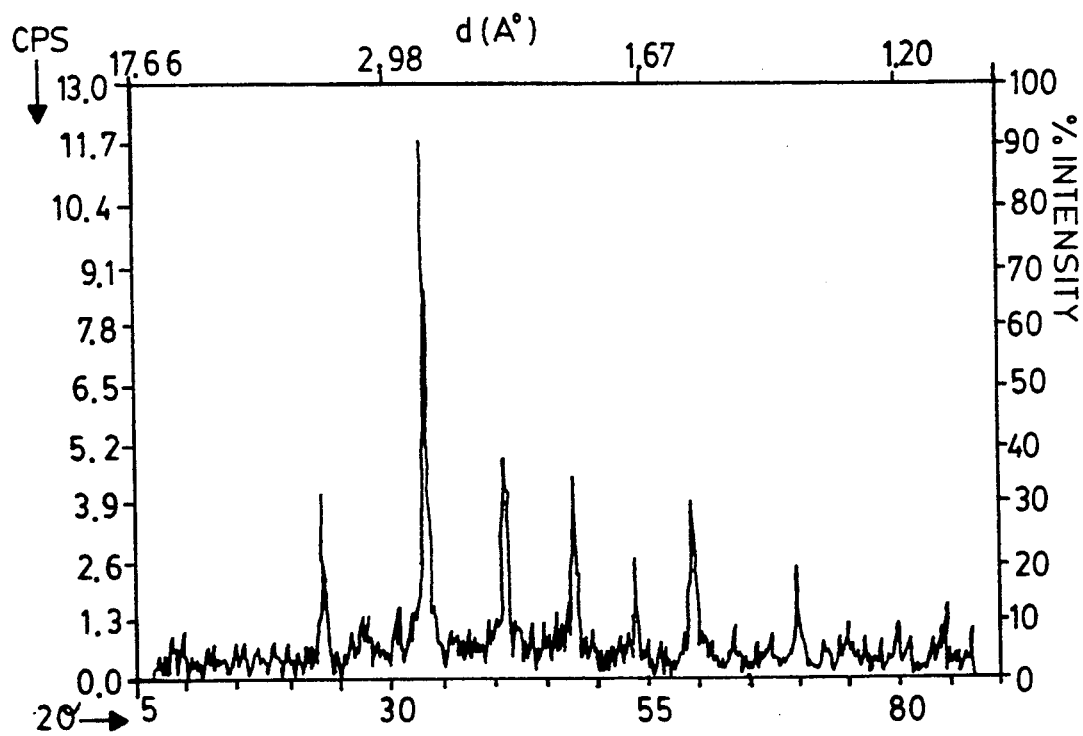
FIG. 2 is an x-ray powder diffraction study of such embodiment of the present invention comprising single phase lanthanum-aluminum-oxide material after heating at 900° C. which shows formation of crystalline LaAlO$_3$.
Figure 3:
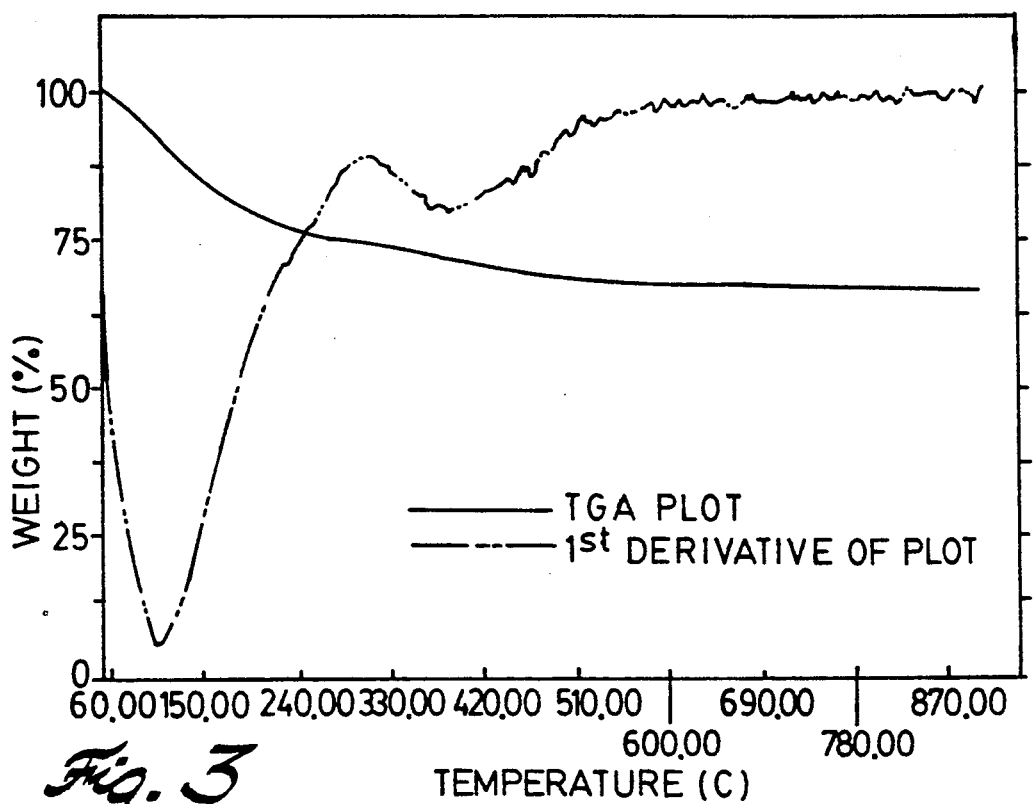
FIG. 3 shows the thermogravimetric analysis of a xerogel prepared according to an embodiment of the present invention in the presence of an acid indicating that its weight loss is complete at 300° C.
Figure 5:
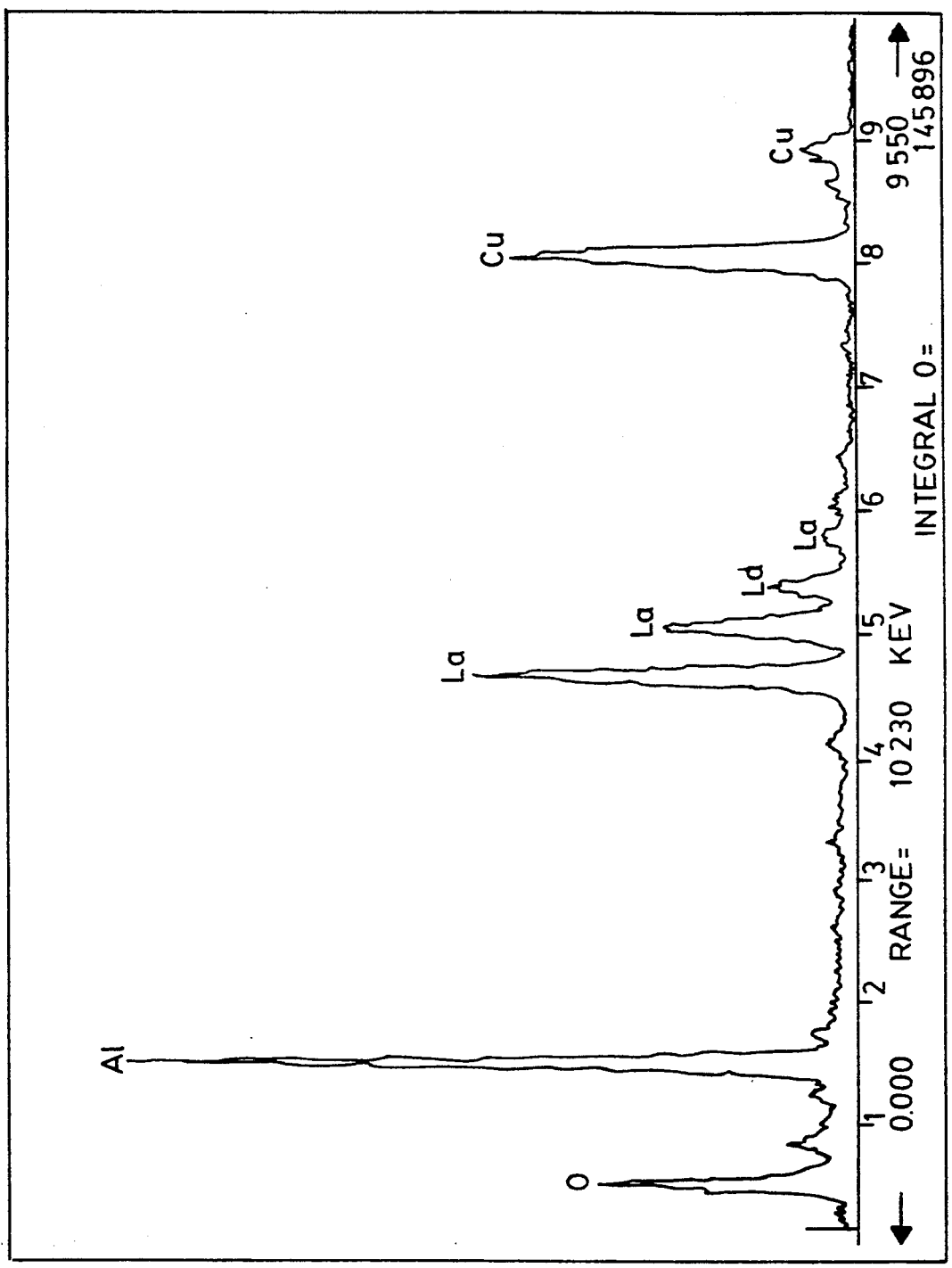
FIG. 5 is an energy dispersive spectrum of one embodiment of lanthanum-aluminum-oxide made according to the present invention showing the presence of lanthanum, aluminum and oxygen in particles of size 10-15 nm (nanometers) in 250-300 nm agglomerates.

A glass substrate is dipped into the sol. On drying, gel formation of the coating takes place, and it is further dehydrated at 100° C. A transparent gel consisting of amorphous lanthanum-aluminum-oxide is produced. Amorphous materials are desirable because they are single phase high surface materials. The gel is dried at 200° C. A TGA of the gel (FIG. 3) shows that the weight loss of the gel is complete at 300° C. The gel is carefully heated in increments of 100° C. and maintained at that temperature for 8 hours. No evidence of a crystalline phase is observed even at 700° C. from x-ray powder diffraction data (FIG. 1). Crystalline lanthanum-aluminum.-oxide forms at 900° C. as evidenced from x-ray powder diffraction date (FIG. 2). The present material is found to contain La—O—Al bonds. Electron-microscopic studies show the material to consist of 10–15 nm particles in 250–300 nm agglomerates. An energy dispersive spectrum (FIG. 5) of several particles shows the presence of lanthanum. At elevated temperatures (900° C.), separation of the crystalline phases takes place. Even though the materials are not single phase at these high temperatures, the distribution of the lanthanides in the alumina matrix remains uniform. Thus the materials remain valuable for applications even after exposure to elevated temperatures. Conventional methods which prepare lanthanum aluminum oxide from aluminum oxide and lanthanum oxide require heating above 1500° C. and the products surface area is substantially lower than that of the material obtained according to the methods of the present invention.

EXAMPLE 2

Tris[(bis(2-propanolato)alumina)hexakis(μ(2-propanolato))]cerium (3.0 g, 3.09 mmol) dissolved in 2-propanol (30 ml) is added to water (30 ml) at 90° C. A gel forms immediately. The reaction mixture is allowed to stir at 90° C. for 30 minutes. Addition of acetic acid (1 ml) results in sol formation. The sol is heated at 90° C. for 16 hours and forms a stable sol which may be used to coat a substrate of form a gel.

A gel is prepared by adding to a solution of cerium alkoxide in 2-propanol, a mixture of water in 2-propanol at −78° C. The gel is converted to a xerogel by drying in a vacuum. It forms a fine powder which is found to be amorphous by x-ray powder diffraction studies. Even though some $CeO_2$ was found to separate out with ordinary atmospheric heating above 500° C., the bulk of the material remained amorphous. The single phase cerium-aluminum-oxide material prepared by both methods is found to have a higher surface area than materials prepared by conventional methods from a mixture of aluminum alkoxide and cerium alkoxide

EXAMPLE 3

An alkoxide mixture of tris[(bis(2-propanolato)-alumina)hexakis($\mu$-(2-propanolato))]lanthanum and tris[(bis(2-propanolato)alumina)hexakis-($\mu$(2-propanolato))]cerium (0.958 g and 1.0 g, respectively, a 1:1 molar ratio) is dissolved in 2-propanol (40 ml) and added to water (80 ml at 80° C.). The suspension so formed is stirred at 80° C. for 30 minutes and acetic acid (1 ml) is added to it. The reaction mixture became almost transparent. After evaporation of 2-propanol, the reaction mixture is heated under gentle reflux at 90° C. for 16 hours and then allowed to cool to room temperature. A xerogel of the material is prepared by evaporation of the solvent from the reaction mixture. Alternately, gel can directly be prepared by adding stoichiometric amounts of water in 2-propanol at $-78°$ C. as described in Examples 2 and 3.

The xerogel is heated to 550° C. and maintained at that temperature to obtain a powdered amorphous material which showed no crystalline phases at 550° C. Even after heating to 900° C., only a small amount of $CeO_2$ could be seen in x-ray diffraction.

EXAMPLE 4

Figure 4:
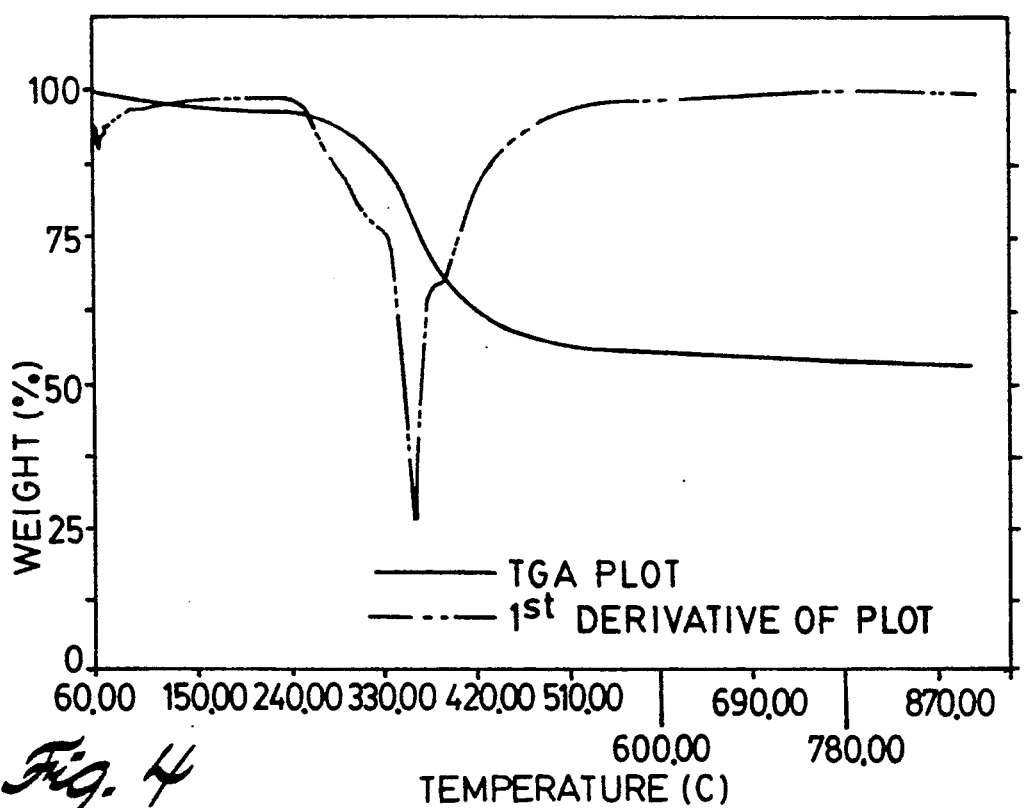
FIG. 4 shows the thermogravimetric analysis of another xerogel prepared according to an embodiment of the present invention indicating that its weight loss is complete at 450° C.

Tris[(bis(2-propanolato)aluminum)-hexakis($\mu$(2-propanolato))]lanthanum (3.0 g) is dissolved in dry 2-propanol (30 ml) and cooled to $-78°$ C. Water (0.7 g) dissolved in 2-propanol (15 ml) is added to the reaction mixture with stirring. After complete addition, stirring is stopped and the reaction mixture is allowed to warm to room temperature. A colorless gel is obtained. Volatiles are removed in vacuum to obtain a xerogel. A TGA of the xerogel (FIG. 4) shows the weight loss to be complete at 450° C. X-ray powder diffraction data shows the material to be amorphous.

I claim:

1. A method for making lanthanide-aluminum-oxide material by sol-gel techniques which comprises:
   (i) forming a reaction mixture from water and a heterobimetallic alkoxide selected from tris[(bis(2-propanolato)alumina)hexakis($\mu$-(2-propanolato))]lanthanides; and
   (ii) adding acid to said reaction mixture to form a sol.

2. The method according to claim 1 wherein said heterobimetallic alkoxide is selected from the group comprising (a) tris[(bis(2-propanolato)alumina)hexakis($\mu$-(2-propanolato))]lanthanum, (b) tris[(bis(2-propanolato)alumina)hexakis($\mu$-(2-propanolato))]cerium, and (c) mixtures of said heterobimetallic alkoxides (a) and (b).

3. A lanthanide-aluminum-oxide material resulting from the method of claim 1.

4. The method according to claim 1 wherein said method further comprises removing from said reaction mixture alcohol formed as a result of hydrolysis of said heterobimetallic alkoxides.

5. The method according to claim 1 wherein said method further comprises the step of maintaining said reaction mixture for a time and at an elevated temperature sufficient to form a stable sol.

6. A method for forming a lanthanum-aluminum-oxide material comprising:

(i) adding a first acid to a reaction mixture made from tris[(bis(2-propanolato)alumina)hexakis($\mu$-(2-propanolato))]lanthanum and water;
(ii) heating said reaction mixture to an elevated temperature and maintaining said reaction mixture at an elevated temperature;
(iii) removing 2-propanol formed as a result of the hydrolysis of said tris[(bis(2-propanolato)alumina)-hexakis($\mu$-(2-propanolato))]lanthanum; and
(iv) adding a second acid to said dispersion to form a sol.

7. The method according to claim 6 which further comprises the step of concentrating said sol to obtain a gel.

8. The method according to claim 6 which further comprises the step of applying a coating of said sol to a substrate and heating said coating to a temperature above about 300° C. to calcine said coating.

9. A lanthanum-aluminum-oxide material resulting from the method of claim 6.

10. A method for forming a cerium-aluminum-oxide material which comprises:
   (i) forming a reaction mixture comprising tris[(bis(2-propanolato)alumina)hexakis($\mu$(2-propanolato))-]cerium and water;
   (ii) maintaining the reaction mixture at an elevated temperature to form a gel thereof; and
   (iii) adding an acid to said gel to convert said gel to a sol.

11. The method according to claim 10 which further comprises the step of applying a coating of said sol to a substrate and heating said coating to a temperature above about 300° C. to calcine said coating.

12. A cerium-aluminum-oxide material resulting from the method of claim 10.

13. A method for making lanthanum-cerium-aluminum-oxide material which comprises:
   (i) preparing and aqueous suspension by hydrolyzing (a) tris[(bis(2-propanolato)alumina)hexakis($\mu$-(2-propanolato))]lanthanum and (b) tris[(bis(2-propanolato)alumina)hexakis($\mu$-(2-propanolato))-]cerium dispersed therein;
   (ii) maintaining the dispersion at an elevated temperature;
   (iii) removing 2-propanol formed as a result of the hydrolysis of said heterobimetallic alkoxide; and
   (iv) adding acid to said dispersion to form a sol.

14. The method according to claim 13 wherein said (a) and (b) are employed in a molar ratio of about 1:1 to 1:3.

15. The method according to claim 13 which further comprises the step of removing from said reaction mixture alcohol formed as a result of the hydrolysis of said heterobimetallic alkoxides.

16. The method according to claim 13 wherein said method further comprises the step of heating said reaction mixture at an elevated temperature.

17. The method according to claim 13 wherein said method further comprises concentrating said sol to obtain a gel.

18. The method according to claim 13 which further comprises the step of applying a coating of said sol to a substrate and heating said coating to a temperature above about 300° C. to calcine said coating.

19. A lanthanum-cerium-aluminum oxide material resulting from the method of claim 13.

20. A lanthanide-aluminum oxide material according to claim 3 wherein said material is selected from the group consisting of sols, gels, xerogels, and aerogels.

* * * * *